(12) United States Patent
Akiyama (10) Patent No.: US 9,524,099 B2
(45) Date of Patent: Dec. 20, 2016

(54) INFORMATION PROCESSING APPARATUS, NON-TRANSITORY READABLE MEDIUM, AND HANDWRITING INPUT METHOD (71) Applicant: FUJITSU LIMITED, Kawasaki-shi, Kanagawa (JP)

(72) Inventor: Katsuhiko Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 37 days.

(21) Appl. No.: 14/600,111

(22) Filed: Jan. 20, 2015

(65) Prior Publication Data
US 2015/0234587 A1 Aug. 20, 2015

(30) Foreign Application Priority Data

Feb. 17, 2014 (JP) .................................. 2014-027725

(51) Int. Cl.
G06F 3/0488 (2013.01)
G06K 9/00 (2006.01)

(52) U.S. Cl.
CPC ....... *G06F 3/04883* (2013.01); *G06K 9/00416* (2013.01)

(58) Field of Classification Search
CPC .... G06F 3/04883; G06K 9/00; G06K 9/00416
USPC ........ 345/173–179; 178/18.01–18.09, 18.11, 178/19.01–19.07
See application file for complete search history.

(56) References Cited

U.S. PATENT DOCUMENTS

| 8,310,461 | B2* | 11/2012 | Morwing | G06F 3/0237 178/18.03 |
| 2002/0009226 | A1* | 1/2002 | Nakao | G06K 9/222 382/177 |
| 2005/0175242 | A1 | 8/2005 | Tanaka | |
| 2009/0256808 | A1* | 10/2009 | Kun | G06K 9/00422 345/173 |
| 2011/0234516 | A1 | 9/2011 | Nakajima et al. | |

FOREIGN PATENT DOCUMENTS

| JP | 2002-041242 | 2/2002 |
| JP | 2011-204141 | 10/2011 |
| WO | 2004/095361 | 11/2004 |

* cited by examiner

*Primary Examiner* — Stephen Sherman
(74) *Attorney, Agent, or Firm* — Fujitsu Patent Center (57) ABSTRACT An apparatus includes an obtaining unit that obtains time-series coordinate data on pointing input; a calculating unit that calculates a distance value from a coordinate position of any one of top, bottom, left, and right ends of an input handwriting to any point of handwriting portions, based on the obtained coordinate data; a display processing unit that performs a displaying process on the input handwriting based on a change in the distance value; and an erasing unit that calculates a stroke distance value between a coordinate position of a stroke of the input handwriting that is input on a time-series basis and a coordinate position of any one of the ends of the input handwriting, and when the stroke distance value is equal to or more than a predetermined value, erases a display of a handwriting that is input before the stroke of the input handwriting on a time-series basis.

6 Claims, 6 Drawing Sheets

WRITE HANDWRITTEN CHARACTER STRING "abc"

FIG. 2B

WRITE "d" IN ADDITION

FIG. 2C

RETURN BY CERTAIN LONG DISTANCE OR MORE
AND WRITE CHARACTER

FIG. 5A
WRITE CHARACTER HAVING SMALL WIDTH

FIG. 5B
IT IS DIFFICULT TO ADD CHARACTER HAVING LARGE WIDTH

FIG. 5C
DISPLAY MODE MAKING USE OF POSITION OF HANDWRITING END

FIG. 6

INFORMATION PROCESSING APPARATUS, NON-TRANSITORY READABLE MEDIUM, AND HANDWRITING INPUT METHOD

CROSS-REFERENCE TO RELATED APPLICATION

This application is based upon and claims the benefit of priority of the prior Japanese Patent Application No. JP2014-027725, filed on Feb. 17, 2014, the entire contents of which are incorporated herein by reference.

FIELD

The disclosures made herein relate to an information processing apparatus, a non-transitory readable medium, and a handwriting input method.

BACKGROUND

In recent years, an information processing apparatus that includes a touch panel formed by combining a display device such as an LCD (Liquid Crystal Display) with a device that detects coordinates of a touch position of a user operation on the surface of the display device, have come into widespread use as an input device. The information processing apparatus including a touch panel can be exemplified by, for example, a PC (Personal Computer), mobile phone, smartphone, notebook PC, tablet PC, PDA (Personal Digital Assistant), navigation device, and the like. A user of the information processing apparatus, for example, performs a predetermined touching operation or the like on the touch panel, to perform input instruction on the information processing apparatus including the touch panel. In addition, the user of the information processing apparatus, for example, can perform handwriting input on the information processing apparatus including the touch panel by moving a finger or an input tool such as a stylus pen touched in an operating region of the touch panel to draw a character, mark, or the like. The character, mark, or the like that is input by handwriting via a touch panel, for example, is displayed on the display device of the touch panel. Note that, for the information processing apparatus, the other pointing devices such as a touchpad and mouse can be used as an input device similar to the touch panel.

Note that there are the following Patent Literatures as related art documents that describe techniques relating to a technique to be described in the present specification.

[Patent document 1] Japanese Patent Laid-Open Publication No. JP 2011-204141

[Patent document 2] International Publication No. WO 2004-095361

[Patent document 3] Japanese Patent Laid-Open Publication No. JP 2002-41242

SUMMARY

In the handwriting input using the above-described pointing device such as the touch panel, for example, it may be difficult to input a character finely with modes such as a character size, the line thickness of a handwritten character, and a character form, as compared with a case of using writing paper and a writing tool or the like. In addition, the size of a display device included in the information processing apparatus or the like tends to depend on and to be limited to the size or the like of the information processing apparatus or the like. For this reason, an input region for a handwritten character or the like tends to be limited to the size of the display device installed in the information processing apparatus or the like, and the amount of characters (the number of characters) that can be drawn by handwriting input tends to be limited to the size of the display region.

In a case where character input is subsequently performed on a limited input region, for example, it is conceivable to provide a software or hardware operating button. It is conceivable that the information processing apparatus detects a button operation and erases a handwriting of a character or the like that has already been input to secure an unwritten space for a character or the like to be subsequently input. In addition, besides the provision of the operating button, for example, conceivable methods include one to tilt the body of the information processing apparatus including the touch panel, one to drag in a predetermined region on the touch panel, and one to perform a predetermined handwriting input such as "@" in the input region.

However, in any one of the above-described methods, the operation such as the button operation and tilting the information processing apparatus is needed whenever to secure an unwritten space during the character input, which may make a user feel the handwriting input difficult or troublesome. Besides the above-described methods, a method to scroll or erase a written handwriting display when a non-inputting time period in an input region reaches a certain period of time (timeout) to secure an unwritten space for character input, has been proposed. However, although the presented method eliminates the operation to secure an unwritten space, waiting time to secure an unwritten space frequently arises during the character input, which may break a character input pace.

The above-described technique can be exemplified by the configuration of the information processing apparatus below. That is, the information processing apparatus includes an obtaining unit that obtains time-series coordinate data on pointing input; a calculating unit that calculates a distance value from a coordinate position of any one of top, bottom, left, and right ends of an input handwriting to any point of handwriting portions, based on the obtained coordinate data; a display processing unit that performs a displaying process on the input handwriting based on a change in the distance value; and an erasing unit that calculates a stroke distance value between a coordinate position of a stroke of the input handwriting that is input on a time-series basis and a coordinate position of any one of the top, bottom, left, and right ends of the input handwriting, and when the stroke distance value is equal to or more than a predetermined value, erases a display of a handwriting that is input before the stroke of the input handwriting on a time-series basis.

Objects and advantages of the disclosures will be realized and attained by means of the elements and combinations particularly pointed out in the claims.

DESCRIPTION OF EMBODIMENTS

An information processing apparatus according to first and second embodiments will be described below with reference to the drawings of FIG. 1 to FIG. 6. The following configuration of the embodiments is merely for example, and the information processing apparatus is not limited to the configuration of the embodiments.

First Embodiment

Figure 1:
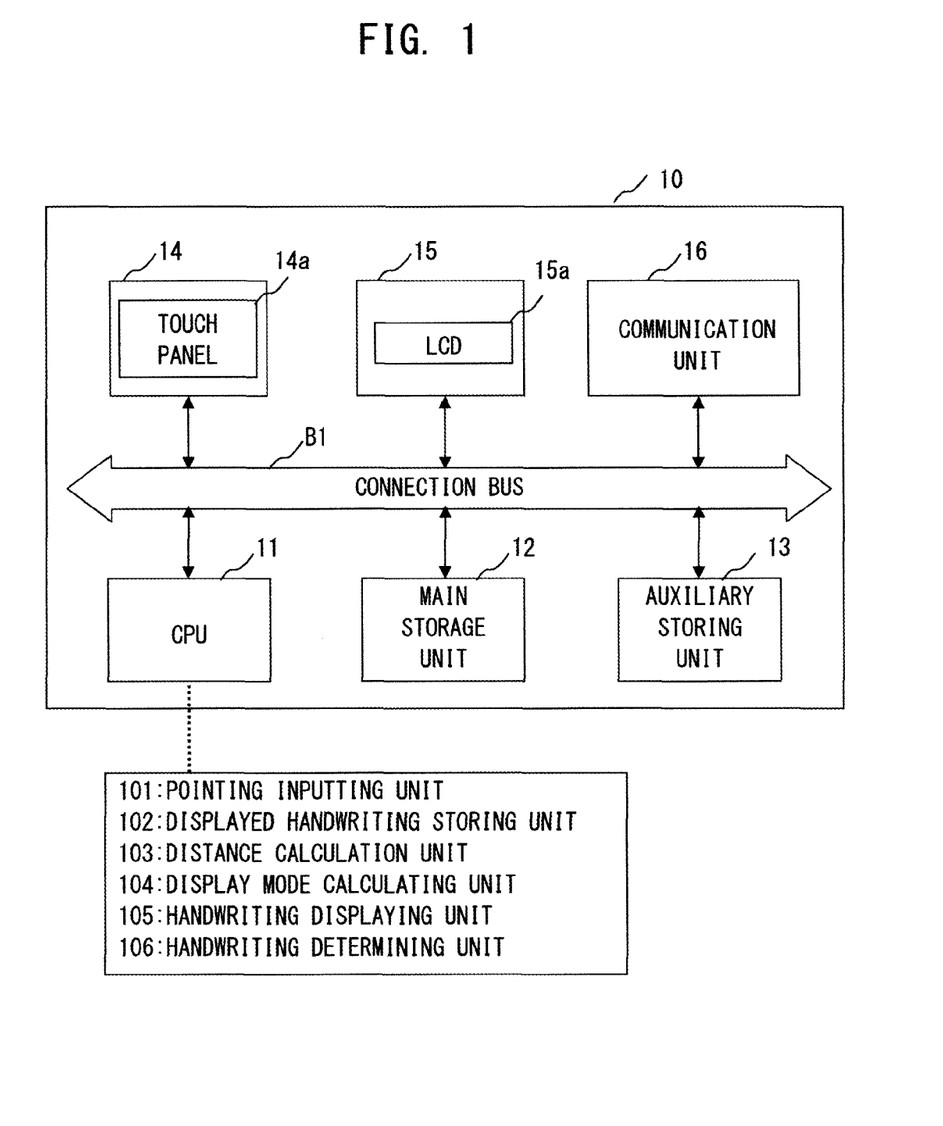
FIG. 1 is a diagram illustrating a configuration example of the hardware of an information processing apparatus of first and second embodiments.

The configuration of hardware of an information processing apparatus 10 of the first embodiment is illustrated in FIG. 1. The information processing apparatus 10 of the first embodiment is, for example, an information processing apparatus such as a PC (Personal Computer), mobile phone, smartphone, notebook PC, tablet PC, PDA (Personal Digital Assistant), and portable game console. The information processing apparatus 10 of the first embodiment includes, for example, a pointing device such as a mouse, trackball, and touch panel 14a in an inputting unit 14, and has a function of accumulating movement loci of instructed positions of a pointing device received by the inputting unit 14, on a time-series basis. The instructed positions according to the movement loci of the pointing device received by the inputting unit 14 are stored in, for example, a predetermined region of a main storage unit 12 together with time information. Then, the information processing apparatus 10 of the first embodiment displays the accumulated movement loci of the instructed positions of the pointing device as, for example, a handwriting of a character, mark, or the like by handwriting input, on a display device such as an LCD (Liquid Crystal Display) 15a included in an outputting unit 15. Here, the handwriting is input histories of character, mark, or the like in handwriting input, and handwritings include a character string, a single character or mark, and a part of a character or mark. For example, when a character string of "abc" is input by handwriting input, a handwriting at the time of finishing the input of the first character "a" is "a,", and when a character "b" is successively input, the handwriting is a character string "ab" at the time of finishing the input of the "b."

A user of the information processing apparatus 10, for example, operates a pointing device such as a mouse and trackball to move the display position of a pointer such as a cursor displayed on the LCD 15a or the like while visually confirming the display position, so as to perform handwriting input of a character, mark, or the like. The character, mark, or the like input by handwriting with the pointing device is displayed on a predetermined display region such as the LCD 15a.

In the touch panel 14a, which is the combination of the display device such as the LCD 15a and a device such as a touchpad that detects the coordinates of a touch position, similar handwriting inputting operation of a character, mark, or the like is performed by a user. For example, the user moves the touch position of a finger or the like touched in an input region of the touch panel 14a while visually confirming a handwriting of the handwriting input displayed on the display region such as the LCD 15a, to perform handwriting input of a desired character, mark, or the like.

In a case of performing handwriting input by operating the pointing device such as a mouse, a trackball, and the touch panel 14a, the amount of characters (the number of characters) that can be drawn may be limited by, for example, the size of the display region such as the LCD 15a. Note that in a case of a pointing device, which is the combination of a device such as the touch panel 14a that detects the coordinates of a touch position and a display device, an input region to receive handwriting input may be further limited.

Limiting the display region for a handwriting of a character, mark, or the like input by handwriting, or the input region relating to handwriting input raises a problem of how to secure an unwritten space for a character or the like to be subsequently input by handwriting. As previously described, to secure an unwritten space, it is preferable to restrain troublesomeness due to a predetermined operation such as an button operation occurring during handwriting input, or the occurrence of an action that breaks an input pace such as waiting for time to elapse.

As a comparison example, for example, it is conceivable that the displayed color or the shade of color of an input handwriting is lightened and erased with time that elapses after the reception of handwriting input, to secure an unwritten space. However, since a handwriting input by handwriting is erased with time elapsing, the handwriting may be erased, for example, during the input of one character, which forces a user to perform an input operation quickly. In contrast, when the speed of handwriting input is increased, erasing a handwriting fails to keep up with the input speed of the user, which may fail to secure an unwritten space.

As another comparison example, it is conceivable that an input region for handwriting input, or a display region that displays an input handwriting is divided into a plurality of frame regions, and an input handwriting is erased for each region to secure an unwritten space. For example, when handwriting input is performed on one of the plurality of divided frame regions and thereafter handwriting input is performed on another frame region, an unwritten space can be secured by erasing the handwriting in the one frame region that is previously input. However, if one character is input by handwriting across, for example, a plurality of borders of the frame regions, a part of the handwriting of the character are to be erased before desired character input is not completed, which may raise a possibility of losing comfort or the like of handwriting input. Character input across a plurality of frame regions can be restrained by increasing the size of the frame regions, but in a case of a mobile phone, smartphone, or the like, which has a small screen size, it is difficult to set an adequate size for frame regions.

In the first embodiment, the information processing apparatus 10 processes one character based on strokes. The stroke can be referred to as a line or point of a minimum unit to form a character form. More specifically, the stroke can be referred to as, for example, a "line" or "point" that is created by a user starting a touch on the pointing device, that is, starting writing, and then withdrawing a touch state on the pointing device. For example, how many strokes to write one kanji is called the number of strokes.

As another comparison example, for example, it is conceivable that strokes input by handwriting are grouped, and the display of a stroke group that is at a long distance from the left end of a stroke being input is erased to secure an unwritten space. However, for example, in the case of "三" (a kanji meaning "three"), the left ends of handwritings are concentrated in the vicinity of the left end of the character, whereas in the case of "川" (a kanji meaning "river"), the left end of a stroke that is last input is in the vicinity of the right end of the character. For this reason, when a stroke group at a long distance from the left end of a stroke being input is to be erased, the timing of erasing a stroke to be erased significantly differs according to the kinds or stroke orders of characters. In a mobile phone, smartphone, or the like, which has a small screen size, the timing of erasing a stroke differs according to the kinds or stroke orders of input characters, which arises a possibility of making a user performing handwriting input misunderstood, leading an operational error.

The information processing apparatus 10 of the first embodiment, for example, changes the display modes of input handwriting portions in accordance with a relative distance between the handwriting end of a handwriting subjected to pointing input and the handwriting portions. The handwriting end can be illustrated, for example, as one side of a circumscribed rectangle that encloses the handwriting subjected to pointing input. In addition, the handwriting portions are, for example, coordinate positions of the handwriting on the input region such as the touch panel 14a, or the display region such as the LCD 15a.

For example, when the right end among top and bottom, and left and right sides of a circumscribed rectangle of a handwriting subjected to pointing input is determined as the end of the handwriting, the information processing apparatus 10 calculates relative distances from coordinates indicating the position of a handwriting end in display coordinates of the LCD 15a to coordinates indicating the positions of the handwriting portions. Then, the information processing apparatus 10 changes the display modes of the displays of the handwriting portions, for example, a transparency, the thicknesses of line, a line-type expression such as a solid line and broken line, on the basis of the calculated distance values. The change of the display modes of the handwriting portions is preferably made such that, for example, the display mode becomes inconspicuous as the calculated distance values increase.

In addition, the information processing apparatus 10 of the first embodiment calculates, for example, a relative distance between a stroke position subjected to pointing input and the handwriting end of a handwriting that is input immediately before inputting the stroke on a time-series basis. The stroke position can be exemplified by, for example, the starting point of a stroke, the center of gravity of the stroke, the center of the circumscribed rectangle of the stroke, the left end or right end of the stroke, and the like. For example, when a stroke position is determined to be the starting point of the stroke, the information processing apparatus 10 calculates the relative distance from display coordinates of the LCD 15a or the like indicating the position of the starting point of the stroke, and display coordinates indicating the position of the handwriting end of the handwriting that is input immediately before inputting the stroke on a time-series basis. Then, when the calculated distance value is equal to or more than a predetermined value, the information processing apparatus 10 secures an unwritten space by erasing a handwriting display that is made before the last input stroke.

With the information processing apparatus 10 of the first embodiment, for example, it is possible to subsequently perform handwriting input without overwriting the handwriting of a character that is previously input even when the display region or the input region is limited. In addition, with the information processing apparatus 10 of the first embodiment, for example, even when the display position of a handwriting input by handwriting reaches the end of display region of the LCD 15a or the like, or the end of the input region of the touch panel 14a or the like, a waiting time to secure an unwritten space does not arise. With the information processing apparatus 10 of the first embodiment, it is possible to subsequently perform handwriting input without erasing a stroke being input during handwriting input. As a result, the information processing apparatus 10 of the first embodiment can provide a technique that enables pointing input using a limited input region.

Figure 2A:
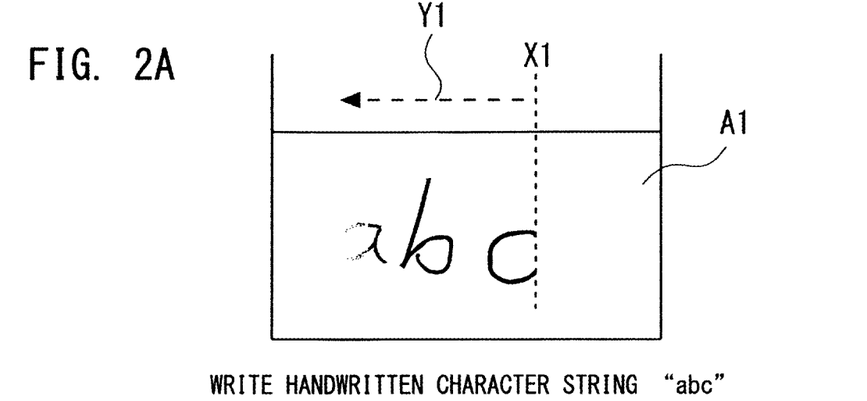
FIG. 2A is a diagram illustrating an explanatory example of a handwriting inputting process of the first embodiment.
Figure 2B:
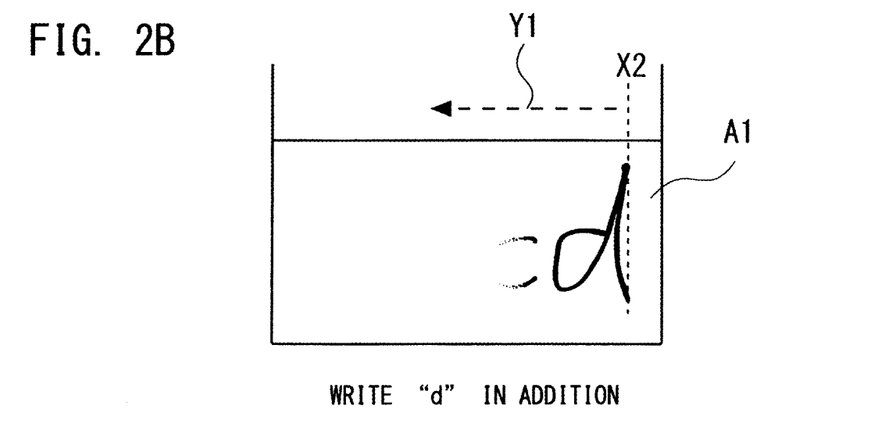
FIG. 2B is a diagram illustrating an explanatory example of the handwriting inputting process of the first embodiment.
Figure 2C:
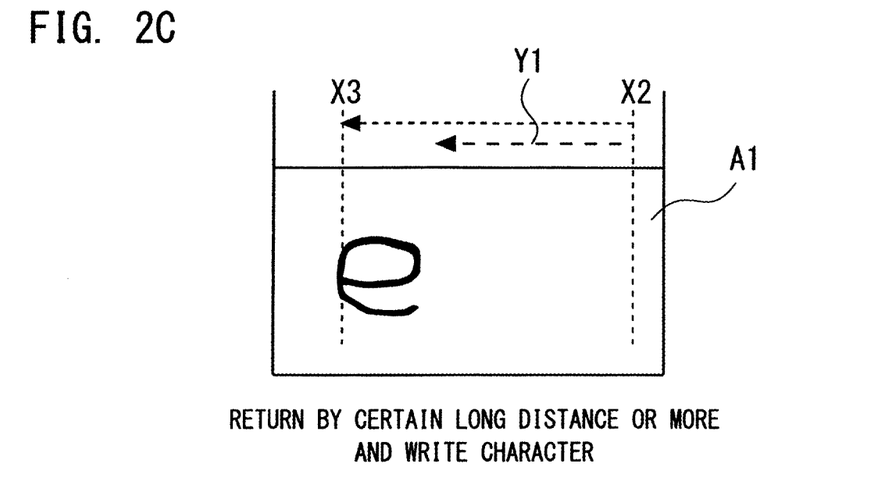
FIG. 2C is a diagram illustrating an explanatory example of the handwriting inputting process of the first embodiment.

FIGS. 2A to 2C illustrate explanatory diagrams of a handwriting inputting process in the information processing apparatus 10 of the first embodiment. In the explanatory diagrams illustrated in FIGS. 2A to 2C, a region A1 is a display region of the LCD 15a or the like that displays a handwriting of, for example, a character, mark, or the like input by handwriting. In addition, in a case of the touch panel 14a that can be combined with the LCD 15a or the like, the region A1 is an input region that detects a touch position of, for example, a finger or an input tool such as a stylus pen that is caused to be touched. The region A1 is limited to the size of the LCD 15a, the touch panel 14a, or the like. Note that, in the following description, the touch panel 14a will be described as a pointing device that receives position coordinates of handwriting input, but for example, position coordinates of an instructed portion by a user performing the handwriting input may be detected and traced based on time-series images captured by an imaging device such as a camera.

(1) Example of Change of Display Mode Based on Distance Between Handwriting End and Handwriting Portions The explanatory diagram in FIG. 2A is an illustration of a handwriting process, for example, when a character string of "abc" is input by handwriting with the touch panel 14a. For example, a user moves a finger or the like touched on the touch panel 14a from a left side in a right-side direction of the region A1 being the input region, performing the handwriting input in an order of "a"→"b"→"c."

The information processing apparatus 10 detects, for example, the position coordinates of the finger or the like of the user touched on the touch panel 14a, and associates the coordinates of the detected touch position with display coordinates on the region A1 being the display region of the LCD 15a. Then, the information processing apparatus 10 displays the movement locus of the touched finger associated with the display coordinates as a handwriting by handwriting input, following the movement locus, for example, on the region A1 of the LCD 15a that is integrally combined with the touch panel 14a. The handwriting by handwriting input is displayed on the region A1 being the display region of the LCD 15a that is integrally combined with the touch panel 14a, following the movement of the finger or the like of the user touched on the touch panel 14a.

Note that the strokes of a character, mark, or the like input by handwriting are expressed by, for example, a movement locus of a period from a point in time when the finger or the like is touched on the touch panel 14a to a point in time when the touched finger is withdrawn from the touch panel 14a. For example, in the case of a character "c," a user moves the finger or the like touched on the touch panel 14a in the region A1 to draw the form of the character "c" during a period from a point in time of touching to a point in time of withdrawing, which causes the character "c" drawn by one stroke to be displayed on the screen of the LCD 15a. In the case of the character "c" drawn by one stroke, the input stroke is a handwriting.

In the explanatory diagram illustrated in FIG. 2A, a broken line X1 represents the position of the handwriting end input by handwriting with the touch panel 14a. The position of the broken line X1 illustrated in FIG. 2A is an example in which the right end of an input handwriting is determined to be the handwriting end.

For example, in the explanatory example in FIG. 2A, the character string "abc" is input in an order of "a"→"b"→"c" in the region A1 being the input region of the touch panel 14a. The handwritings of the input character string "abc" are displayed on the region A1 being the display region of the LCD 15a in the order of "a"→"b"→"c." Since the last character "c" is a character drawn by one stroke, the right end of the handwriting at the time of completing the input of the last stroke, that is, the right end of the input stroke of the character "c" input by handwriting is determined to be a handwriting end.

The information processing apparatus 10 of the first embodiment determines, for example, the right end of a handwriting input in the region A1 as the handwriting end, and changes the display modes of the handwriting portions in accordance with relative distances from the handwriting end as a criterion to the handwriting portions that are input in a left direction from the handwriting end. The explanatory diagram illustrated in FIG. 2A is an example of the case where, as the changes of the display modes, the transparencies of the displayed handwriting portions are changed.

In the explanatory example in FIG. 2A, the handwriting end of the character string "abc" that is input by handwriting in the region A1 is the right end of the character "c," being the last input stroke, and is displayed by the position of the broken line X1. In addition, a left arrowed line Y1 of a bold broken line extending from the position of the broken line X1 in the left-side direction of the region A1 represents a relative distance from the handwriting end of the character "c." The information processing apparatus 10 calculates the relative distances from, for example, the position coordinates of the broken line X1 as a criterion to the position coordinates of the handwriting portions of the characters "a" and "b" that are input on the left side of the broken line X1.

In the explanatory example in FIG. 2A, the character "a" has a character width in a direction from, for example, the left end of the handwriting toward the broken line X1 side. Thus, the left end portion of the handwriting of the character "a," which is the furthest from the position of the broken line X1 (has the longest relative distance), is displayed with a high transparency, and a light shade of color of a displayed color. Then, since a relative distance from the broken line X1 becomes small as approaching from the left end of the handwriting of the character "a" toward the broken line X1 side, the change is made such that the transparency is made small and the shade of color of the displayed color is made dark. The information processing apparatus 10 of the first embodiment changes the display modes of the handwritings input by handwriting on the region A1 in accordance with the distance values calculated based on the coordinate positions of the handwriting portions of the character "a" and the coordinate position of the handwriting end of the character "c."

Note that the information processing apparatus 10 may have, for example, a threshold value to determine distance values between the handwriting end and the handwriting portions, and may change the display modes of the handwriting portions of which the distance values exceed the threshold value. When handwriting input is subsequently performed, as illustrated by the character "b" in FIG. 2A, the handwritings around the last input handwriting can be maintained in a normal display mode, which can enhance convenience of the handwriting input. Note that the threshold value is a distance value that is set in accordance with, for example, the size of the region A1. For example, character widths are experimentally obtained through handwriting input, and the maximum value, average value, or the like of the obtained character widths can be set as the threshold value. Alternatively, for example, a region width being a certain proportion, such as ½ and ⅓, in the display region may be set as the threshold value.

In FIG. 2A, in the right-side region of the character string "abc" that is input by handwriting in the region A1, or in a region between the broken line X1 and the right end portion of the region A1, an unwritten space available for handwriting input is left. A user who performs character input following the character string "abc" is to subsequently perform handwriting input in, for example, an unwritten space between the broken line X1 and the right end portion of the region A1. FIG. 2B illustrates the explanatory diagram of a state that a character "d" is subsequently input in the right-side region of the character "c" of the character string "abc."

In the explanatory diagram in FIG. 2B, in the state that the character "d" is subsequently input, the character string in the region A1 becomes "abcd," and the handwriting end of the character string becomes the right end of the handwriting at the time of completing the last stroke input of the character "d" that is subsequently input. For this reason, the broken line X1 representing the position of the handwriting end of the character string "abc" illustrated in FIG. 2A is to be updated as the character "d" is input, and is to move to the position of a broken line X2 illustrated in FIG. 2B. The display modes of the character string "abcd" input in the region A1 are also updated as the position of the handwriting end is updated due to the subsequently input character "d." The display modes of the character string "abcd" is to be changed, for example, in transparency in accordance with the position coordinate of the handwriting end of the subsequently input character "d."

In the state that the character string "abcd" is input in the region A1, the information processing apparatus 10 of the first embodiment changes the display mode of the handwriting display of the character string "abc" that is input in the left-side region of the broken line X2 with the position coordinates of the broken line X2 being the handwriting end of the character string "abcd" as a criterion. Note that, in the explanatory example in FIG. 2B, for example, the handwriting of the character "a" and a part of the strokes of the handwriting of the character "b" among the previously input character string "abc" fades out in the region A1. This is because relative distances between the handwriting portions of the character "a" and a part of the handwriting of the character "b," and the broken line X2 reach, for example, a distance value equivalent to a maximum value of transparency of handwriting display (e.g., 100%).

Here, when the maximum character width of the characters input by handwriting is determined as a unit width for example, a gradient to change the display mode can be exemplified by a region width having unit widths of two characters. This is because the handwritings of the second or more character previous to the end of the last input handwriting are highly likely to be characters that are determined to be input, which thus produces less sense of incongruity in handwriting input even when the characters are caused to fade out in the region A1. Note that the maximum character width can be exemplified by, for example, the maximum value of the obtained character widths which are experimentally obtained through handwriting input. Alternatively, for example, the maximum character width may be determined as a region width of a certain proportion, such as ½ and ⅓, in the display region.

As illustrated in FIG. 2B, by changing the display modes in such a manner that handwritings are caused to fade out in the region A1 in accordance with relative distances between the end of the input handwriting and the handwriting portions, an unwritten space is secured in a handwriting region in which the handwritings fade out. In addition, in the explanatory example in FIG. 2B, for example, remaining parts of the handwritings of the character "b" that do not fade out and the handwriting portions of the character "c" among the previously input character string "abc" are displayed with their transparencies changed to be high in accordance with the relative distances from the broken line X2. As illustrated in FIG. 2B, with the information processing apparatus 10 of the first embodiment, it is possible to reliably secure an unwritten space that enables handwriting input without erasing a handwriting display during handwriting input.

In the explanatory example in FIG. 2B, the handwriting end of the character "d" that is input subsequently to the character string "abc" is positioned in the vicinity of the right end portion of the region A1. In addition, between the handwriting end of the character "d" and the end portion of the region A1, there is no region having a size to subsequently perform handwriting input. A user who performs character input subsequently to the character string "abcd" is to perform handwriting input in a region in which the handwriting display fades out, that is, in the left-side region of the region A1. That is, with the information processing apparatus 10 of the first embodiment, it is possible to perform handwriting input subsequently without overwriting the handwritings of previously input characters even when the size of the region A1 is limited.

(2) Change of Display Mode Due to Relative Distance from Handwriting End Immediately Before Stroke Input Next, FIG. 2C illustrates the explanatory diagram of a case where a character "e" is subsequently input in the region in which the handwriting display fades out. The information processing apparatus 10 as illustrated in FIG. 2C, for example, calculates a relative distance between the stroke position subjected to pointing input and the handwriting end of a handwriting that is input immediately before the input of the stroke on a time-series basis, and erases a handwriting display that is made before the last input stroke on a time-series basis in handwriting input.

In the explanatory example in FIG. 2C, the character "e" that is input subsequently to the character string "abcd" becomes the last handwriting input on a time-series basis in handwriting input. The input position of the character "e" is in the left-side region of the region A1, and the input position of the stroke is in the vicinity of the left end portion of the region A1. For this reason, the stroke position of the character "e" is widely away from the handwriting end of the immediately previous character "d" on a time-series basis in handwriting input. Note that a broken line X3 in the drawing represents an input position at the time when the stroke position of the character "e" in the region A1 is determined as the starting point of the stroke.

The information processing apparatus 10 illustrated in FIG. 2C, for example, detects that a relative distance between the stroke position of the character "e" in the region A1 and the handwriting end of the character "d" is equal to or more than a predetermined value, and erases a handwriting display that is made before the last input stroke on a time-series basis in handwriting input. Here, the predetermined value is a distance value that is set in accordance with the size of the region A1. For example, the predetermined value can be exemplified by being equal to or more than the maximum character width of characters input by handwriting. As illustrated in FIGS. 2B to 2C, this is because, by erasing previously displayed handwritings when a new stroke input is performed by returning from one end side of a region in which input handwritings are displayed to the other end side of the region, it is possible to present a region considered to be a new input row to a user. As a result, even in a case of moving from one end side of a limited region to the other end side of the region opposing thereto to repeat handwriting input, it is possible to satisfy a user about the handwriting inputting function.

In the explanatory example in FIG. 2C, the information processing apparatus 10, at the time of inputting the stroke of the character "e" for example, calculates a distance value between the stroke position of the character "e" and the handwriting end of the character "d," and compares the calculated distance value with a predetermined value. Then, the information processing apparatus 10 erases, when the calculated distance value is equal to or more than the predetermined value, handwriting displays displayed in the region A1. For example, at the time of inputting the stroke of the character "e," a part of handwritings of the character "b" illustrated in FIG. 2B, and the handwriting displays of the characters "c" and "d" in the region A1 are erased all together. In the explanatory example in FIG. 2C, there is no handwritings of the character string that is previously input on a time-series basis in handwriting input in the right-side region of the character "e." For this reason, with the information processing apparatus 10 of the first embodiment, it is possible to present a region considered to be a new input row to a user who subsequently performs handwriting input.

In the information processing apparatus 10 of the first embodiment, for example, even when the display position of a handwriting input by handwriting reaches the end of display region of the LCD 15a or the like, or the end of the input region of the touch panel 14a or the like, a waiting time to secure an unwritten space does not arise. With the information processing apparatus 10 of the first embodiment, for example, as illustrated in FIG. 2C, it is possible to comfortably repeat handwriting input of characters, marks, or the like from the left side to the right side of the region A1.

(Device Configuration)

Returning to FIG. 1, the information processing apparatus 10 of the first embodiment includes a CPU (Central Processing Unit) 11, the main storage unit 12, an auxiliary storing unit 13, the inputting unit 14, the outputting unit 15, and a communication unit 16, which are connected to one another by a connection bus B1. The main storage unit 12 and the auxiliary storing unit 13 are recording media that the information processing apparatus 10 can read.

The information processing apparatus 10 causes the CPU 11 to expand a program stored in the auxiliary storing unit 13 on a working area in the main storage unit 12 in an executable manner, and controls peripheral equipment through the execution of the program. This enables the information processing apparatus 10 to implement a function that meets the above-described given object.

In the information processing apparatus 10 illustrated in FIG. 1, the CPU 11 is a central processing unit that control the whole of the information processing apparatus 10. The CPU 11 performs processes under the program stored in the auxiliary storing unit 13. The main storage unit 12 is a storage medium that the CPU 11 uses to cache the program or data, or to expand the program or data on a working area. The main storage unit 12 includes, for example, a RAM (Random Access Memory) or a ROM (Read Only Memory).

The auxiliary storing unit 13 stores various programs and various pieces of data in a recording medium in a readable or writable manner. The auxiliary storing unit 13 is also called an external storage device. The auxiliary storing unit 13 stores an OS (Operating System), various programs, various tables, and the like. The OS includes a communication interface program that exchanges data with an external device or the like that is connected via the communication unit 16. The external device or the like includes, for example, an information processing apparatus such as another PC and server, an external storage device, and the like on a network (not illustrated).

The auxiliary storing unit 13 is, for example, an EPROM (Erasable Programmable ROM), a solid state drive, a hard disk drive (HDD) device, or the like. Alternatively, as the auxiliary storing unit 13, for example, a CD drive device, DVD drive device, BD drive device, and the like can be presented. The recording medium includes, for example, a silicon disk including a nonvolatile semiconductor memory (flash memory), hard disk, CD, DVD, BD, USB (Universal Serial Bus) memory, memory card, and the like.

The inputting unit 14 receives operating instructions and the like from a user or the like. The inputting unit 14 is an input device such as a camera, input button, keyboard, pointing device, wireless remote controller, and microphone. The pointing device includes, for example, the touch panel 14a, mouse, trackball, joystick, and the like. Information input from the inputting unit 14 is notified to the CPU 11 via the connection bus B1. For example, coordinate information detected by the pointing device, image information captured by the camera, and the like are notified to the CPU 11 via the connection bus B1.

The outputting unit 15 outputs data to be processed by the CPU 11 or data to be stored in the main storage unit 12. The outputting unit 15 includes a display device such as the LCD 15a, CRT (Cathode Ray Tube) display, PDP (Plasma Display Panel), EL (Electroluminescence) panel, and organic EL panel. In addition, the outputting unit 15 includes an outputting device such as a printer and speaker. The communication unit 16 is, for example, an interface with a network or the like to which the information processing apparatus 10 is connected.

The information processing apparatus 10 causes the CPU 11 to read the OS, various programs, and the various pieces of data stored in the auxiliary storing unit 13 out to the main storage unit 12 and execute them to implement the functional means illustrated in FIG. 1 while executing the corresponding programs. The information processing apparatus 10 implements the pointing inputting unit 101, the displayed handwriting storing unit 102, the distance calculation unit 103, the display mode calculating unit 104, the handwriting displaying unit 105, and the handwriting determining unit 106 illustrated in FIG. 1 while executing the corresponding programs.

Note that any one of the functional means may be included in the other information processing apparatus or the like. For example, the information processing apparatus 10 includes the pointing inputting unit 101 and the handwriting displaying unit 105, and an information processing apparatus including the displayed handwriting storing unit 102 and an information processing apparatus including the distance calculation unit 103 are connected to one another via a network. Then, an information processing apparatus including the display mode calculating unit 104 and an information processing apparatus including the handwriting determining unit 106 are connected thereto. In such a manner, the information processing apparatus 10 may function by distributing the functional means into a plurality of information processing apparatuses and implementing the functional means. The information processing apparatus 10 can be implemented as, for example, a cloud being a group of computers in a network, which enables reducing processing loads of the functional means.

(Functional Block Configuration)

Figure 3:
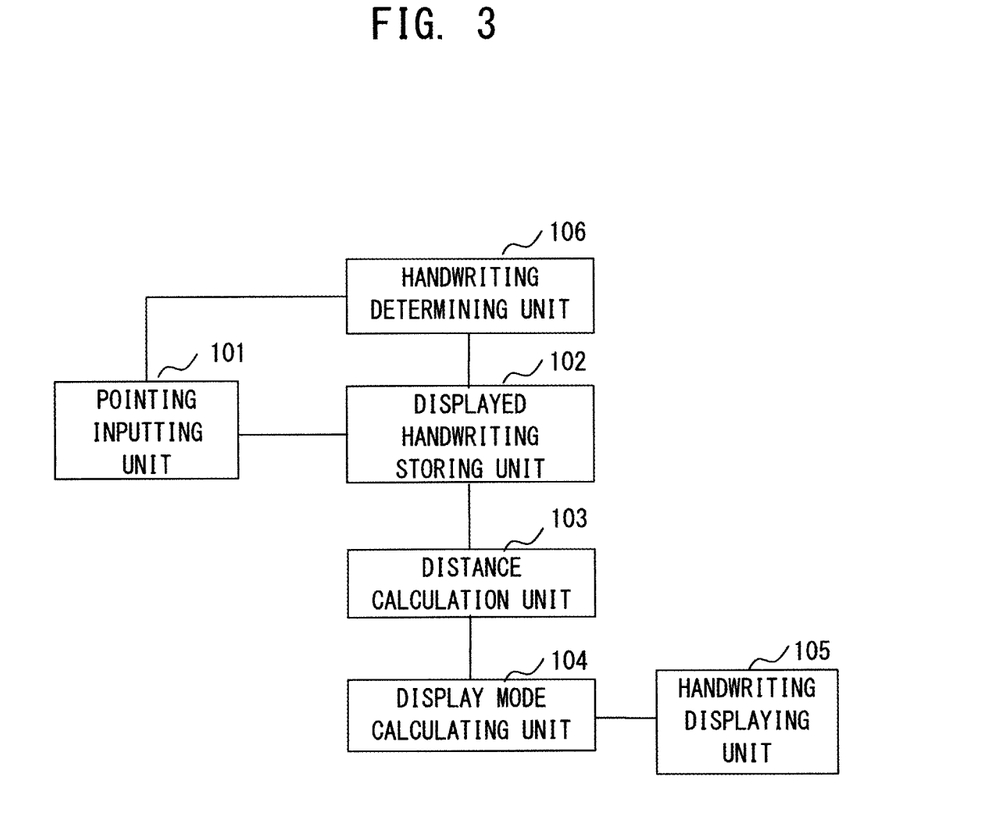
FIG. 3 is a diagram illustrating an explanatory example of the functional block of the first and second embodiments.

FIG. 3 illustrates an explanatory diagram of a functional block in the information processing apparatus 10 of the first embodiment. In the explanatory diagram illustrated in FIG. 3, the information processing apparatus 10 includes functional means of the pointing inputting unit 101, the displayed handwriting storing unit 102, the distance calculation unit 103, the display mode calculating unit 104, the handwriting displaying unit 105, and the handwriting determining unit 106. Note that, in the explanatory diagram illustrated in FIG. 3, the information processing apparatus 10 includes, for example, the auxiliary storing unit 13 as a reference destination of the above functional means, or a storage destination of data to be managed.

The pointing inputting unit 101 illustrated in FIG. 3, for example, receives the input of pointing coordinates detected by a pointing device such as the touch panel 14a. The pointing coordinates are input as, for example, two-dimensional coordinates (X, Y) representing coordinate values in an input region of the touch panel 14a or the like, or a display region of the LCD 15a or the like. The input of the pointing coordinates is performed at, for example, a predetermined periodical interval such as 1/30 second. The pointing inputting unit 101 adds, for example, time information on a reception time to the received pointing coordinates, and temporarily stores it in a predetermined region of the main storage unit 12. The pointing coordinates and the like received by the pointing inputting unit 101 are, for example, delivered to the displayed handwriting storing unit 102 and the handwriting determining unit 106. Note that the time information added by the pointing inputting unit 101 may be added by, for example, the pointing device or the like.

The displayed handwriting storing unit 102, for example, accumulates the pointing coordinates and the like delivered from the pointing inputting unit 101 in the predetermined region of the main storage unit 12, as input handwriting. The input handwriting accumulated by the displayed handwriting storing unit 102 is, for example, deleted in response to a notification from the handwriting determining unit 106. Note that the displayed handwriting storing unit 102 may store an input handwriting to be deleted in, for example, the auxiliary storing unit 13.

The distance calculation unit 103, for example, refers to the input handwriting stored in the main storage unit 12 by the displayed handwriting storing unit 102, and identifies a circumscribed rectangle that encloses the input handwriting. The coordinates of the circumscribed rectangle enclosing the input handwriting, for example, can be identified from the maximum value and the minimum value of X coordinates, and the maximum value and the minimum value of the Y coordinates of the input handwriting. For example, the distance calculation unit 103 may compare between X coordinate values of the handwriting portions of an input handwriting, and may identify the maximum value of the X coordinates as the coordinate of the right end of the circumscribed rectangle, and identify the minimum value as the coordinate of the left end of the circumscribed rectangle. Similarly, for example, the distance calculation unit 103 may compare the Y coordinate values of the handwriting portions of the input handwriting, and may identify the maximum value of the Y coordinates as the coordinate of the top end of the circumscribed rectangle, and identify the minimum value as the coordinate of the bottom end of the circumscribed rectangle.

Then, the distance calculation unit 103 identifies any one of the identified top, bottom, left, and right ends of the circumscribed rectangle as the end of input handwriting. The end of input handwriting, for example, can be set in accordance with the size of the input region such as the touch panel 14a in which handwriting input is performed or the display region of the LCD 15a or the like. For example, as illustrated in FIGS. 2A to 2C, in a case where a handwriting input is horizontally performed from the left side to the right side of the region A1, the right end of the circumscribed rectangle may be set as the handwriting end. Alternatively, in a case where a handwriting input is vertically performed from the top side to the bottom side of the region A1, the bottom end of the circumscribed rectangle may be set as the handwriting end. That is, the end of a character input by handwriting in the region in a writing direction can be set as the handwriting end.

The distance calculation unit 103 calculates, with the a coordinate value of the identified end of input handwriting determined as a criterion, a distance value from any coordinate position of the handwriting portions of the input handwriting. The calculated distance value is, for example, temporarily stored in the predetermined region of the main storage unit 12, and delivered to the display mode calculating unit 104.

The display mode calculating unit 104, for example, calculates the display modes of the handwriting portions of the input handwriting stored in the auxiliary storing unit 13 in accordance with the distance value delivered from the distance calculation unit 103. The display mode can be exemplified by, for example, a color combination, the shade of color of display, a line width, or a line-type expression such as a solid line and a broken line. In addition, the calculation of the display modes in accordance with the distance value is preferably performed such that, for example, the handwriting display becomes inconspicuous as the distance value increases. The calculation of the display modes will be described in detail with reference to FIG. 4.

The handwriting displaying unit 105, for example, displays the input handwriting stored in the auxiliary storing unit 13 according to the display modes calculated by the display mode calculating unit 104. The handwriting determining unit 106 identifies the stroke position of the input stroke based on the pointing coordinates delivered from the pointing inputting unit 101. The stroke position of the input stroke can be exemplified by, for example, the starting point of a stroke, the center of gravity of the stroke, the center of the circumscribed rectangle of the stroke, the left end or right end of the stroke, and the like.

The handwriting determining unit 106 calculates a relative distance between the identified stroke position and the handwriting end of a handwriting that is input immediately before inputting the stroke on a time-series basis. The handwriting end of the handwriting that is input immediately before inputting the stroke is identified by the distance calculation unit 103. The handwriting determining unit 106, for example, erases a handwriting display that is made before the last input stroke when the distance value of the calculated relative distance is equal to or more than the predetermined value. In addition, the handwriting determining unit 106 notifies the displayed handwriting storing unit 102 of the erasure of the handwriting display. When receiving the notification from the handwriting determining unit 106, the displayed handwriting storing unit 102, for example, deletes input handwriting data previous to the last input stroke that is accumulated in the predetermined region of the main storage unit 12. Note that the predetermined value has been described with reference to FIG. 2C.

(Process Flow)

Figure 4:
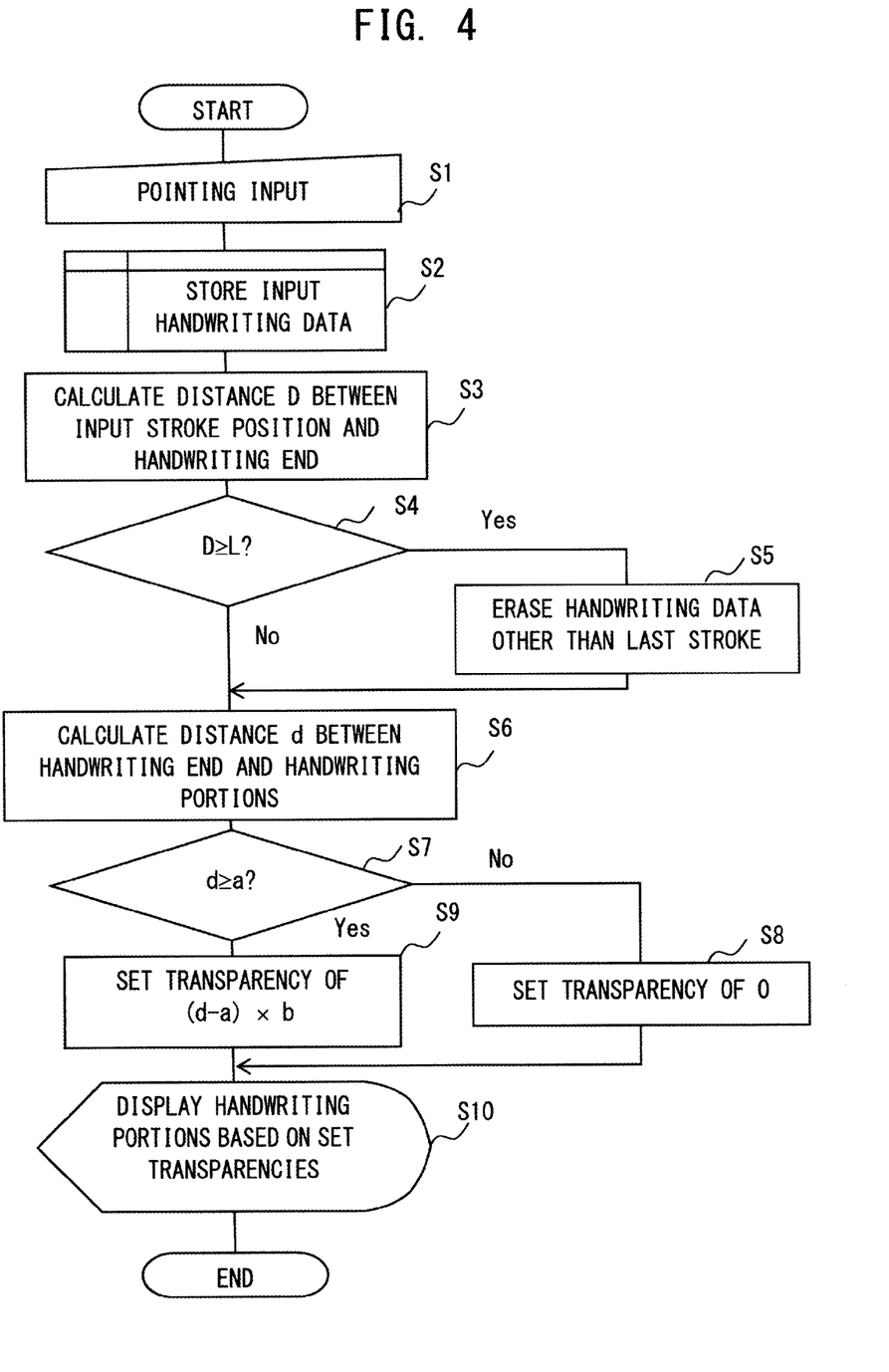
FIG. 4 is a flow chart illustrating the handwriting inputting process of the first embodiment.

The handwriting inputting process of the first embodiment will be described below with reference to FIG. 4. FIG. 4 illustrates a flow chart of a handwriting inputting process in the information processing apparatus 10. The information processing apparatus 10, for example, executes the handwriting inputting process illustrated in FIG. 4 under the computer program that is expanded in an executable manner by the main storage unit 12.

In the flow chart illustrated in FIG. 4, the start of the handwriting inputting process can be presented as, for example, a time when pointing coordinates are input via the pointing device such as the touch panel 14a, or when the process is invoked at a periodical interval such as ⅓₀ second. The information processing apparatus 10 executes the handwriting inputting process of the first embodiment with the occurrence of the above-described events as a trigger.

In the flow chart illustrated in FIG. 4, the information processing apparatus 10, for example, receives pointing coordinates that are input on a time-series basis via a pointing device such as the touch panel 14a (S1). Then, the information processing apparatus 10, for example, adds time information on a reception time to the pointing coordinates, and stores them in the predetermined region of the main storage unit 12 (S2). Alternatively, the information processing apparatus 10 may accumulate the pointing coordinates or the like to which the time information is added in, for example, the auxiliary storing unit 13 as an input handwriting.

In the flow chart illustrated in FIG. 4, the information processing apparatus 10 performs a handwriting erasing process to secure an unwritten space in the processes of S3 to S5, and performs a changing process on a display mode of the handwriting to secure an unwritten space in the processes of S6 to S10. Note that, the following description will be made assuming that the change of the display mode is the change of the transparency of a handwriting display, and this applies to a case where a color combination, a line width, and a line-type expression such as a solid line or broken line are changed. The change of the display mode may be performed such that the handwriting display fades out in the display region as the distance value increases.

The information processing apparatus 10, for example, refers to the input handwriting accumulated in the predetermined region of the main storage unit 12, and calculates a relative distance value D between the last input stroke position and the handwriting end of an input handwriting that is input immediately before inputting the stroke on a time-series basis (S3). The position of the input stroke and the handwriting end have been described with reference to FIG. 3.

For example, assuming that the input stroke position is determined as the starting point of the stroke, the right end among the top, bottom, left, and right ends of the circumscribed rectangle of the handwriting is determined as the handwriting end. In the process of S3, the information processing apparatus 10, for example, calculates the relative distance value D between the starting point position coordinates of the input stroke and the position coordinates of the right end of an input handwriting that is input immediately before the input stroke. Then, the information processing apparatus 10, for example, performs comparison determination of sizes between the distance value D calculated in the process of S3 and a threshold value L (S4). Here, the threshold value L is held in, for example, the auxiliary storing unit 13. The information processing apparatus 10, for example, may read out the threshold value L held in the auxiliary storing unit 13 while executing the handwriting inputting process, and may store it in the predetermined region of the main storage unit 12. Note that the threshold value L has been described as the predetermined value with reference to FIG. 2C.

When the distance value D calculated in the process of S3 is equal to or more than the threshold value L (S4, Yes), the information processing apparatus 10 erases a handwriting display before the last input stroke on a time-series basis, and erases input handwriting data previous to the last input stroke that is accumulated in the predetermined region of the main storage unit 12 in the process of S2 (S5). By performing the processes of S4 to S5, the information processing apparatus 10 can erase the handwriting display based on, for example, the relative distance from the handwriting end that is made immediately before inputting the stroke illustrated in FIG. 2C.

In contrast, when the distance value D calculated in the process of S3 is less than the threshold value L (S4, No), the information processing apparatus 10 shifts to the process of S6. In the process of S6, the information processing apparatus 10, for example, refers to the input handwriting that is accumulated in the predetermined region of the main storage unit 12 in the process of S2, and calculates the relative distance values d between the handwriting end and the handwriting portions. For example, when the right end among the top, bottom, left, and right ends of the circumscribed rectangle of the handwriting is determined as the handwriting end, the information processing apparatus 10 calculates the distance values d from the position coordinates of the right end of the input handwriting and the position coordinates of the handwriting portions. Then, the information processing apparatus 10, for example, performs the comparison determination of sizes between the distance values d calculated in the process of S6 and a threshold value a (S7). The information processing apparatus 10 may hold the threshold value a in the auxiliary storing unit 13 in advance, and may read out the held threshold value a while executing the handwriting inputting process, and store it in the predetermined region of the main storage unit 12. Note that the threshold value a has been described with reference to FIG. 2A.

When the distance values d calculated in the process of S6 are less than the threshold value a (S7, No), the information processing apparatus 10, for example, sets the transparencies of the handwriting portions having the distance values d less than the threshold value a to a minimum value (S8). When the transparency varies, for example, in a range from 0 to 100, the information processing apparatus 10 sets the transparencies at "0" being the minimum value, and displays the handwriting portions having the distance values d less than the threshold value a in the normal display mode in the display region to display the input handwriting (S10).

In contrast, when the distance values d calculated in the process of S6 are equal to or more than the threshold value a (S7, Yes), the information processing apparatus 10, for example, sets transparencies in accordance with the distance values d (S9). The information processing apparatus 10, for example, multiplies a difference between the distance values d and the threshold value a by a gradient coefficient b to calculate the transparencies based on (d-a)×b. The gradient to change the display mode has been described with reference to FIG. 2B. For example, when the display mode is changed to fade out based on a maximum character width of two characters, the gradient coefficient can be expressed by (maximum value of transparency)/(maximum character width×2). The information processing apparatus 10 sets values calculated based on (d-a)×b to the transparencies, and displays the handwriting portions having the distance values d equal to or more than the threshold value a in the display region to display the input handwriting (S10). By executing the processes of S6 to S10, the information processing apparatus 10, for example, can change the display modes of an input handwriting based on the distance between the handwriting end illustrated in FIGS. 2A to 2B and the handwriting portions. The information processing apparatus 10, for example, can secure an unwritten space by changing the display modes of the input handwriting such as the displayed color and the shade of color, such that the input handwriting fades out in the display screen. In addition, by having a threshold value to determine distance values between the handwriting end and the handwriting portions and by changing the display modes of the handwriting portions having distance values exceeding the threshold value, the information processing apparatus 10, for example, can maintain the handwriting around the last input handwriting in the normal display mode, which can enhance convenience of the handwriting input.

Here, the processes of S1 and S2 executed by the information processing apparatus 10 are one example of a step of obtaining time-series coordinate data on pointing input. In addition, the CPU 11 or the like of the information processing apparatus 10 executes the processes of S1 and S2 as an example of means that obtains the time-series coordinate data on pointing input.

In addition, the process of S6 executed by the information processing apparatus 10 is an example of a step of calculating a distance value from the coordinate position of any one of the top, bottom, left, and right ends of the input handwriting to any point of the handwriting portions based on the obtained coordinate data. In addition, the CPU 11 or the like of the information processing apparatus 10 executes the process of S6 as an example of means that calculates a distance value from the coordinate position of any one of the top, bottom, left, and right ends of the input handwriting to any point of the handwriting portions based on the obtained coordinate data.

In addition, the processes of S7 to S10 executed by the information processing apparatus 10 are an example of a step of executing the displaying process of the input handwriting based on the change of the distance values. In addition, the CPU 11 or the like of information processing apparatus 10 executes the processes of S7 to S10 as an example of means that executes the displaying process of the input handwriting based on the change of the distance values.

In addition, the processes of S3 to S5 executed by the information processing apparatus 10 are an example of a step of calculating a stroke distance value between the coordinate position of the stroke of a input handwriting that is input on a time-series basis and the coordinate position of any one of the top, bottom, left, and right ends of the input handwriting, and erasing a handwriting display that is input before the stroke of the input handwriting when the stroke distance value is equal to or more than the predetermined value. In addition, the CPU 11 or the like of the information processing apparatus 10 executes the processes of S3 to S5 as an example of means that calculates the stroke distance value between the coordinate position of the stroke of the input handwriting that is input on a time-series basis and the coordinate position of any one of the top, bottom, left, and right ends of the input handwriting, and erases the handwriting display that is input before the stroke of the input handwriting on a time-series basis when the stroke distance value is equal to or more than the predetermined value.

In addition, the processes of S7 to S9 executed by the information processing apparatus 10 are an example of a step of calculating the degrees of change of the display modes of the input handwriting portions based on the distance value. In addition, the CPU 11 or the like of the information processing apparatus 10 executes the processes of S7 to S9 as an example of display mode calculating means that calculates the degrees of change of the display modes of the input handwriting portions based on the distance value.

Second Embodiment

The input handwriting in the first embodiment performs the change such that the display mode fades out based on a relative distance relationship between the coordinate position of the handwriting end of the input handwriting and the coordinate positions of the handwriting portions. In a second embodiment, in addition to the relative distance relationship of the first embodiment, the display modes of the handwriting portions are changed to fade out based on the handwriting width of an input handwriting, the coordinate position of the handwriting end, and the coordinate positions of the handwriting portions. As a result, with the information processing apparatus 10 of the second embodiment, for example, it is possible to secure an adequate unwritten space to perform handwriting input regardless of the position of an input handwriting even when the handwriting width of a handwriting subject to handwriting input extends off an input region, or the half width of a display region. Note that the information processing apparatus 10 of the second embodiment is implemented by a configuration similar to that of the information processing apparatus 10 of the first embodiment, and thus the description of the configuration of the information processing apparatus 10 will be omitted.

Figure 5A:
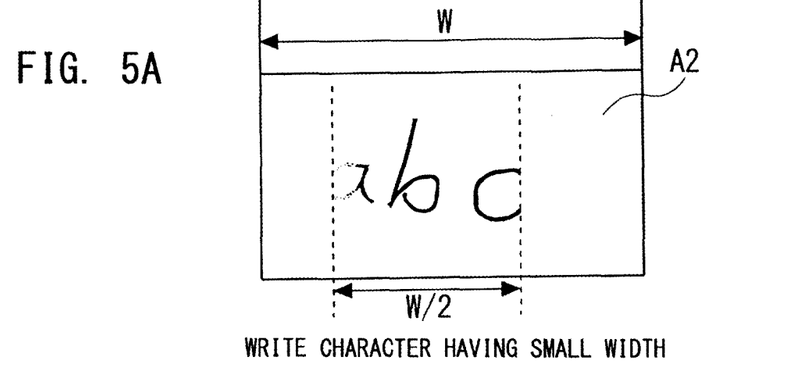
FIG. 5A is a diagram illustrating an explanatory example of a handwriting inputting process in a second embodiment.
Figure 5B:
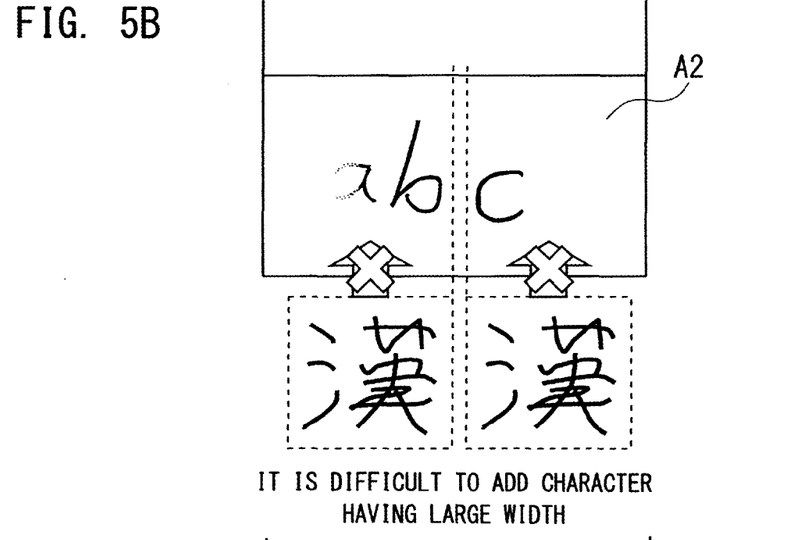
FIG. 5B is a diagram illustrating an explanatory example of the handwriting inputting process in the second embodiment.
Figure 5C:
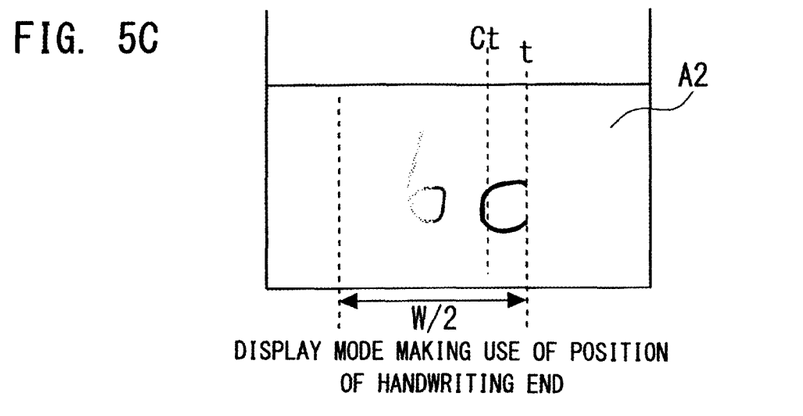
FIG. 5C is a diagram illustrating an explanatory example of the handwriting inputting process in the second embodiment.

FIGS. 5A to 5C illustrate explanatory diagrams of a handwriting inputting process of the information processing apparatus 10 in the second embodiment. In the explanatory diagrams illustrated in FIGS. 5A to 5C, a region A2 is, for example, a display region of the LCD 15a or the like, or an input region of the touch panel 14a or the like. The region width of the region A2 in a horizontal direction is "W." In the explanatory example in FIGS. 5A to 5C, for example, a character string "abc" input by handwriting is input in such a manner that the handwriting width thereof exceeds "W/2" being the half width of the region A2. Note that, in the explanatory example in FIGS. 5A to 5C, it is assumed that a maximum character width of an input handwriting is set at "W/2" by, for example, a user. Here, the maximum character width of an input handwriting is a parameter to limit a maximum distance in a horizontal direction within which the input handwriting is displayed in the display region.

The explanatory diagram illustrated FIG. 5A depicts a state immediately after the handwriting input of a character string "abc" having a handwriting width exceeding "W/2" being the maximum character width is performed in the region A2. Since the handwriting width of the input character string "abc" illustrated in FIG. 5A exceeds "W/2," the handwriting display is performed across the center of the region A2. Then, the display modes of the handwriting display of the input character string "abc" is changed such that a part of the handwriting of the character "a" fades out, which has a long distance value from the position of the right end of the character "c" to be the handwriting end.

In the state illustrated in FIG. 5A, when handwriting input is subsequently performed in the region A2, as a region to be input by handwriting, the left-side region of the region A2 in which a part of the handwriting display of the character string "abc" fades out, or an unwritten space on the right side of the character "c" becomes an input region. In this state, for example, assume that a kanji or the like having the maximum character width is subsequently input. FIG. 5B illustrates the explanatory diagram of a case where a character "漢" (corresponding to "kan" of "kanji") having handwriting width equivalent to the maximum character width is subsequently input.

As illustrated in FIG. 5B, among the character string "abc", the input handwritings of the characters "b" and "c" having the display modes that do not fade out are displayed in the vicinity of the center of the region A2. Among the character string "abc," the character "b" is displayed in a region in a left-side direction from the center of the region A2, and the character "c" is displayed in a region in a right-side direction from the center of the region A2.

When the character "漢" is subsequently input in the unwritten space on the right side of the character "c", since the handwriting width thereof is equivalent to "W/2" being the maximum character width, no adequate unwritten space to input the character "漢" is left. In contrast, also in a case of returning to the left-side region of the region A2 in which a part of the handwriting display of the character string "abc" fades out to continue handwriting input, there is no adequate region to input the character "漢" having the handwriting width equivalent to the maximum character width because the character "b" is displayed in the vicinity of the center.

The information processing apparatus 10 of the second embodiment performs the change such that the display mode fades out based on, the handwriting width of the input handwriting, the coordinate position of the handwriting end, and the coordinate position of the handwriting portions, in addition to a relative distance relationship between the coordinate position of the handwriting end of the input handwriting and the coordinate positions of the handwriting portions. For example, with respect to the input region (region A2) illustrated in FIG. 5A or the like, assume that inputting starts from the vicinity of the left end, and handwriting input is horizontally performed in a direction toward the right end. The information processing apparatus 10, for example, when the coordinate position of the right end of the input handwriting crosses the vicinity of the center of the input region, and the handwriting width exceeds "W/2,"

changes the degree of change of the display mode, such as the shade of display, of the handwriting that is input in a left-half region of the input region. As a result, with the information processing apparatus 10 of the second embodiment, for example, it is possible to secure an adequate unwritten space to perform handwriting input even when a character having a handwriting width equivalent to the maximum value is subsequently input.

Note that in a case where, with respect to the input region, inputting starts from the vicinity of the top end and the handwriting input is vertically performed in a direction toward the bottom end, the information processing apparatus 10, for example, detects that the coordinate position of the bottom end of the input handwriting crosses the vicinity of the input region. Then, the information processing apparatus 10 may change the degree of change of the display mode of the handwriting that is input in the top-half region of the input region when the handwriting width in the vertical direction exceeds a maximum input width. The information processing apparatus 10 can secure an adequate unwritten space to perform the handwriting input when a character having a handwriting width equivalent to the maximum value is subsequently input even if the handwriting input is vertically performed in the vertical direction.

(Process Flow)

Figure 6:
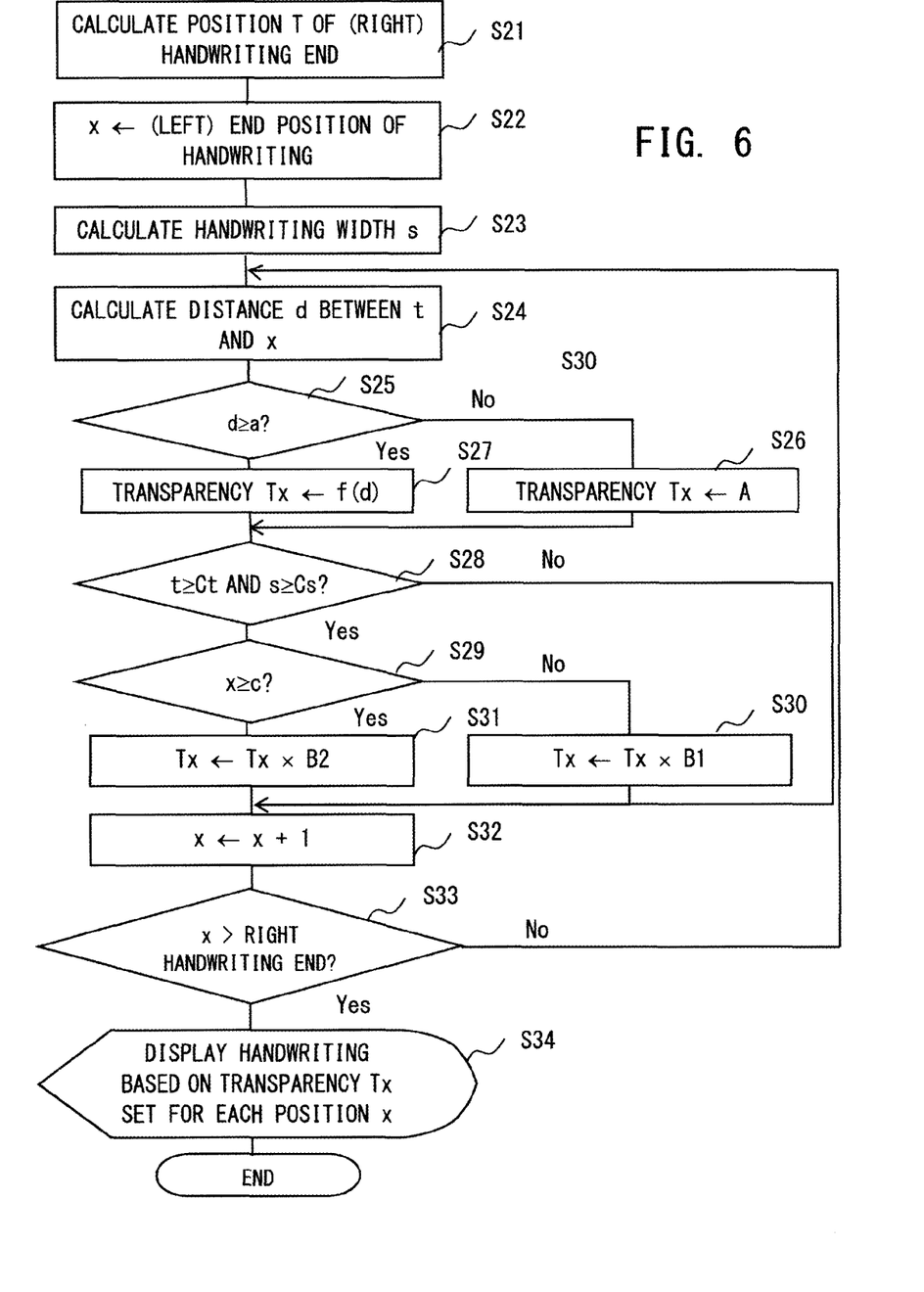
FIG. 6 is a flow chart illustrating the handwriting inputting process in the second embodiment.

A handwriting inputting process of the information processing apparatus 10 of the second embodiment will be described below with reference to the explanatory diagram illustrated in FIG. 5C and a flow chart illustrated in FIG. 6. The explanatory diagram illustrated in FIG. 5C is a diagram to explain a changing process of the display mode of the input handwriting of the second embodiment. FIG. 6 is an illustration of a flow chart of the handwriting inputting process in the information processing apparatus 10 of the second embodiment. The process illustrated in FIG. 6, for example, corresponds to the changing process of S6 to S10 of the display mode of the input handwriting illustrated in FIG. 4 of the first embodiment. The information processing apparatus 10 of the second embodiment, for example, executes the changing processes of S21 to S34 of the display mode of the input handwriting illustrated in FIG. 6, instead of the processes S6 to S10 illustrated in FIG. 4. Note that, the following description will be made assuming that the handwriting end of the input handwriting is the right end among the top, bottom, left, and right ends of the circumscribed rectangle enclosing the input handwriting.

In the flow chart illustrated in FIG. 6, the information processing apparatus 10, for example, refers to the input handwriting that is accumulated in the predetermined region of the main storage unit 12, and identifies the position of the handwriting end of the input handwriting (S21). Then, the information processing apparatus 10, for example, refers to the input handwriting that is accumulated in the predetermined region of the main storage unit 12, and identifies position coordinates x of the handwriting portions of the input handwriting as targets of the process to change the display mode (S22). In the process of S22, the information processing apparatus 10, for example, identifies the position coordinate x of the left end of the input handwriting, as a target of the process to change the display mode.

In the explanatory diagram illustrated in FIG. 5C, for example, the information processing apparatus 10 identifies a coordinate position t of the right end of the input handwriting of the character "c" in the character string "abc" that is input by handwriting in the region A2 (S21), and identifies the position of the left end of the input handwriting of the character "a" in the character string "abc" as the position coordinate x (S22).

The information processing apparatus 10, for example, calculates a handwriting width s of the input handwriting based on the coordinates that are identified through the processes of S21 and 22 (S23), and calculates a distance value d between the coordinate position t of the right end of the input handwriting and the position coordinate x (S24). In the process of S22, since the information processing apparatus 10 identifies the position of the left end of the input handwriting of the character "a" in the character string "abc" that is input by handwriting in the region A2 as the position coordinate x, the handwriting width s calculated in the process of S23 is identical to the distance value d calculated in the process of S24.

The information processing apparatus 10 performs comparison determination of sizes between the distance value d calculated in S24 and the threshold value a (S25), and when the distance value d is less than the threshold value a (S25, No), sets a predetermined value "A" to a transparency Tx for the position coordinate x (S26). In contrast, the information processing apparatus 10, for example, when the distance value d is equal to or more than the threshold value a (S25, Yes), sets a function f(d) of transparency calculated in accordance with the distance value d to the transparency Tx for the position coordinate x, based on a function d(x) (S27).

The predetermined value "A" of transparency that is set in the process of S26, for example, can be freely set at a value between a minimum value and a maximum value of transparency, according to the performance or the like of the information processing apparatus 10. In addition, the function f(d) may be any function as long as the function decreases the transparency from the transparency "A" set in the process of S26 as a value of (d-a) increases, which causes the handwriting display fades out.

Next, in the process of S28, the information processing apparatus 10 performs position determination in the region A2 on the coordinate position t of the right end of the input handwriting that is identified in the process of S21, and performs width size determination on the handwriting width s that is identified in the process of S22. For example, the information processing apparatus 10 defines a threshold value for the position determination to the coordinate position t of the right end of the input handwriting as a constant Ct, and a threshold value for the width size determination to the handwriting width s as a constant Cs. For example, a coordinate value of the region A2 can be set as the constant Ct, and the constant Cs can be exemplified by a horizontal distance value between the starting point coordinates of the input handwriting and the coordinates of the handwriting end. The information processing apparatus 10 determines in the process of S28, for example, whether or not the coordinate position t of the right end of the input handwriting that is identified in the process of S21 is equal to or more than the constant Ct, and the handwriting width s that is identified in the process of S22 is equal to or more than the constant Cs.

When a condition that the coordinate position t of the right end of the input handwriting is equal to or more than the constant Ct and the handwriting width s is equal to or more than the constant Cs is not satisfied (S28, No), the information processing apparatus 10, for example, shifts to the process of S32. In contrast, when the condition that the coordinate position t of the right end of the input handwriting is equal to or more than the constant Ct and the handwriting width s is equal to or more than the constant Cs is satisfied (S28, Yes), the information processing apparatus 10, for example, shifts to the process of S29.

In the processes of S29 to S31, the information processing apparatus 10 sets a function to weight the transparency that is calculated in the process of S27. Here, the function to weight the transparency may be set at any function as long as the function changes the gradient of change of transparency in accordance with the position coordinate x in the region A2. For example, the information processing apparatus 10 can define the weighting function as g(x), in which a gradient coefficient B1 is set when the position coordinate x is less than a threshold value C, and a gradient coefficient B2 is set when the position coordinate x is equal to or more than the threshold value C. Here, the threshold value C, for example, can be set at the half width (W/2) of the region width W of the region A2.

The information processing apparatus 10, for example, performs comparison determination between the position coordinate x that is identified in the process of S22 and the threshold value C (S29). When the position coordinate x that is identified in the process of S22 is less than the threshold value C (S29, No), the information processing apparatus 10, for example, makes the transparency Tx a value calculated by multiplying the transparency Tx that is calculated in the process of S27 by the weighting function g(x). In the example of the above-described function g(x), a value calculated by multiplying the transparency Tx that is calculated in the process of S27 by the gradient coefficient B1 is made to be the transparency Tx (S30).

In contrast, when the position coordinate x that is identified in the process of S22 is equal to or more than the threshold value C (S29, Yes), the information processing apparatus 10, for example, makes the transparency Tx a value calculated by multiplying the transparency Tx that is calculated in the process of S27 by the weighting function g(x). In the example of the above-described function g(x), a value calculated by multiplying the transparency Tx that is calculated in the process of S27 by the gradient coefficient B2 is made to be the transparency Tx (S31).

Then, the information processing apparatus 10 increments the position coordinate x that is identified in the process of S22 by "1" (S32), and the processes of S24 to S33 are repeated until the incremented position coordinate x reaches the coordinate position t of the right end of the input handwriting that is identified in the process of S21 (S33, No). When the position coordinate x that is incremented in the process of S32 reaches the coordinate position t of the right end of the input handwriting that is identified in the process of S21 (S33, Yes), the information processing apparatus 10 sets the transparency Tx that is set for each position coordinate x, and displays the handwriting portions (S34).

In the explanatory example illustrated in FIG. 5C is an example of the display mode of the case where the threshold value a is "W/2," the transparency A is "1," the threshold value C is "W/2," the constant Ct is "5×W/8," the constant Cs is "W/2," the gradient coefficient B1 is "0.3," and the gradient coefficient B2 is "1.". In FIG. 5C, the display mode of the character "b" that is displayed in the vicinity of the center among the character string "abc", as compared with FIG. 5A, has a higher transparency and fades out. For this reason, it is possible to secure an unwritten space to perform handwriting input in a region on the left-side of the character "c." By including the function depending on the distance value and the function depending on the coordinate positions of the input handwriting portions, the information processing apparatus 10 can change the display mode in accordance with the handwriting position and the handwriting width of the input handwriting. By setting conditions based on a plurality of threshold values, the information processing apparatus 10 can change the display mode more finely in accordance with the handwriting position and the handwriting width of input handwriting.

Here, the processes of S21 to S33 executed by the information processing apparatus 10 are an example of a step of calculating the degree of change of a display mode based on a distance value, a handwriting width calculated from the coordinate position of any one of the top, bottom, left, and right ends of an input handwriting and the coordinate position of an opposite end of the input handwriting in a vertical or horizontal direction, and the coordinate positions of the input handwriting portions. In addition, the CPU 11 or the like of the information processing apparatus 10 executes the processes of S21 to S33 as an example of means that calculates the degree of change of the display mode based on the distance value, the handwriting width calculated from the coordinate position of any one of the top, bottom, left, and right ends of the input handwriting and the coordinate position of the opposite end of the input handwriting in the vertical or horizontal direction, and the coordinate positions of the input handwriting portions.

In addition, the processes of S26 to S31 executed by the information processing apparatus 10 are an example of steps of having a function depending on a distance value and a function depending on the coordinate positions of input handwriting portions, when a condition that the coordinate position of any one of the top, bottom, left, and right ends of the input handwriting is equal to or more than a second threshold value and a handwriting width is equal to or more than a third threshold value is satisfied, determines a calculation value that is calculated by multiplying the function depending on the distance value by the function depending on the coordinate positions of the input handwriting portions, as the degrees of change of the display modes of the input handwriting portions, and when the condition is not satisfied, determines the degrees of change of the display modes of the input handwriting portions based on the function depending on the distance value. In addition, the CPU 11 or the like of the information processing apparatus 10 executes the processes of S26 to S31 as an example of means that has the function depending on the distance value and the function depending on the coordinate positions of the input handwriting portions, when the condition that the coordinate position of any one of the top, bottom, left, and right ends of the input handwriting is equal to or more than the second threshold value and the handwriting width is equal to or more than the third threshold value, determines the calculation value calculated by multiplying the function depending on the distance value by the function depending on the coordinate positions of the input handwriting portions, as the degrees of change of the display modes of the input handwriting portions, and when the condition is not satisfied, determines the degrees of change of the display modes of the input handwriting portions based on the function depending on the distance value.

With the information processing apparatus 10 of the second embodiment, it is possible to secure an unwritten space in which a character having a handwriting width equivalent to a maximum value can be subsequently input even when an input handwriting crosses the center of an input region.

Effect of Embodiments

The above-described information processing apparatus enables enhancing the operability of character input with a pointing device using a limited input region of a display device.

[Non-Transitory Computer Readable Recording Medium]

A program that causes a computer, or the other machine or device (hereafter, referred to as a computer or the like) to implement any one of the above-described functions can be recorded in a non-transitory recording medium readable by the computer or the like. Then, the function can be provided by causing the computer or the like to read and execute the program in this recording medium.

Herein, the recording medium readable by the computer or the like means a recording medium capable of accumulating information such as data or programs through electrical, magnetic, optical, mechanical, or chemical actions, which can be read by the computer or the like. Among such recording media, those detachable from the computer or the like include, for example, a flexible disk, magneto-optical disk, CD-ROM, CD-R/W, DVD, Blu-ray Disk, DAT, 8 mm tape, and a memory card such as a flash memory. In addition, recording media fixed in the computer or the like include a hard disk and ROM.

What is claimed is:

1. An information processing apparatus, comprising:
   an obtaining unit that obtains time-series coordinate data on pointing input;
   a calculating unit that calculates a distance value from a coordinate position of any one of top, bottom, left, and right ends of an input handwriting to any point of handwriting portions, based on the obtained coordinate data;
   a display processing unit that performs a displaying process on the input handwriting based on a change in the distance value;
   an erasing unit that calculates a stroke distance value between a coordinate position of a stroke of the input handwriting that is input on a time-series basis and a coordinate position of any one of the top, bottom, left, and right ends of the input handwriting, and when the stroke distance value is equal to or more than a predetermined value, erases a display of a handwriting that is input before the stroke of the input handwriting on a time-series basis; and
   a display mode calculating unit that calculates degrees of change of display modes of input handwriting portions based on the distance value,
   wherein the display mode calculating unit determines the degrees of change of the display modes such that the display mode is not changed when the distance value is less than a first threshold value, and a transparency of display increases as a difference value between the distance value and the first threshold value increases when the distance value is equal to or more than the first threshold value,
   the display mode calculating unit calculates the degrees of change of the display modes based on the distance value, a handwriting width that is calculated based on a coordinate position of any one of the top, bottom, left, and right ends of the input handwriting and a coordinate position of an opposite end of the input handwriting in a vertical or horizontal direction, and positions of the input handwriting portions, and
   the display mode calculating unit has a function depending on the distance value and a function depending on coordinate positions of the input handwriting portions, when a condition that the coordinate position of any one of the top, bottom, left, and right ends of the input handwriting is equal to or more than a second threshold value and the handwriting width is equal to or more than a third threshold value is satisfied, determines a calculation value calculated by multiplying the function depending on the distance value by the function depending on the coordinate positions of the input handwriting portions as the degrees of change of the display modes of the input handwriting portions, and when the condition is not satisfied, determines the degrees of change of the display modes of the input handwriting portions based on the function depending on the distance value.

2. The information processing apparatus according to claim 1, wherein the displaying process of the input handwriting is to display the input handwriting based on changes of the display modes that are calculated by the display mode calculating unit.

3. The information processing apparatus according to claim 1, wherein the display mode calculating unit determines the degrees of change of the display modes such that the input handwriting is erased from a display screen that displays the input handwriting as the distance value increases.

4. The information processing apparatus according to claim 1, wherein the distance value is calculated based on a coordinate position of an end in a direction in which the input handwriting lines on a time-series basis, among the top, bottom, left, and right ends of the input handwriting.

5. A non-transitory readable medium recorded with a handwriting input program that causes a computer to execute processing comprising:
   obtaining time-series coordinate data on pointing input;
   calculating a distance value from a coordinate position of any one of top, bottom, left, and right ends of an input handwriting to any point of handwriting portions, based on the obtained coordinate data;
   performing a displaying process on the input handwriting based on a change in the distance value;
   calculating a stroke distance value between a coordinate position of a stroke of the input handwriting that is input on a time-series basis and a coordinate position of any one of the top, bottom, left, and right ends of the input handwriting, and when the stroke distance value is equal to or more than a predetermined value, erasing a display of a handwriting that is input before the stroke of the input handwriting on a time-series basis;
   calculating degrees of change of display modes of the input handwriting portions based on the distance value;
   determining the degrees of change of the display modes such that the display mode is not changed when the distance value is less than a first threshold value, and a transparency of display increases as a difference value between the distance value and the first threshold value increases when the distance value is equal to or more than the first threshold value;
   calculating the degrees of change of the display modes based on the distance value, a handwriting width that is calculated based on a coordinate position of any one of the top, bottom, left, and right ends of the input handwriting and a coordinate position of an opposite end of the input handwriting in a vertical or horizontal direction, and positions of the input handwriting portions; and
   determining, when a condition that the coordinate position of any one of the top, bottom, left, and right ends of the input handwriting is equal to or more than a second threshold value and the handwriting width is equal to or more than a third threshold value is satisfied, a calculation value calculated by multiplying a function depending on the distance value by a function depending on coordinate positions of the input handwriting portions as the degrees of change of the display modes of the input handwriting portions, and determining, when the condition is not satisfied, the degrees of change of the display modes of the input handwriting portions based on the function depending on the distance value.

6. A handwriting input method executed by a computer, the method comprising:

obtaining time-series coordinate data on pointing input;

calculating a distance value from a coordinate position of any one of top, bottom, left, and right ends of an input handwriting to any point of handwriting portions, based on the obtained coordinate data;

performing a displaying process on the input handwriting based on a change in the distance value;

calculating a stroke distance value between a coordinate position of a stroke of the input handwriting that is input on a time-series basis and a coordinate position of any one of the top, bottom, left, and right ends of the input handwriting, and when the stroke distance value is equal to or more than a predetermined value, erasing a display of a handwriting that is input before the stroke of the input handwriting on a time-series basis;

calculating degrees of change of display modes of the input handwriting portions based on the distance value;

determining the degrees of change of the display modes such that the display mode is not changed when the distance value is less than a first threshold value, and a transparency of display increases as a difference value between the distance value and the first threshold value increases when the distance value is equal to or more than the first threshold value;

calculating the degrees of change of the display modes based on the distance value, a handwriting width that is calculated based on a coordinate position of any one of the top, bottom, left, and right ends of the input handwriting and a coordinate position of an opposite end of the input handwriting in a vertical or horizontal direction, and positions of the input handwriting portions; and determining, when a condition that the coordinate position of any one of the top, bottom, left, and right ends of the input handwriting is equal to or more than a second threshold value and the handwriting width is equal to or more than a third threshold value is satisfied, a calculation value calculated by multiplying a function depending on the distance value by a function depending on coordinate positions of the input handwriting portions as the degrees of change of the display modes of the input handwriting portions, and determining, when the condition is not satisfied, the degrees of change of the display modes of the input handwriting portions based on the function depending on the distance value.

* * * * *